Oct. 23, 1923.
A. J. FARMER
GREASE GUN
Filed Feb. 20, 1922
1,471,330
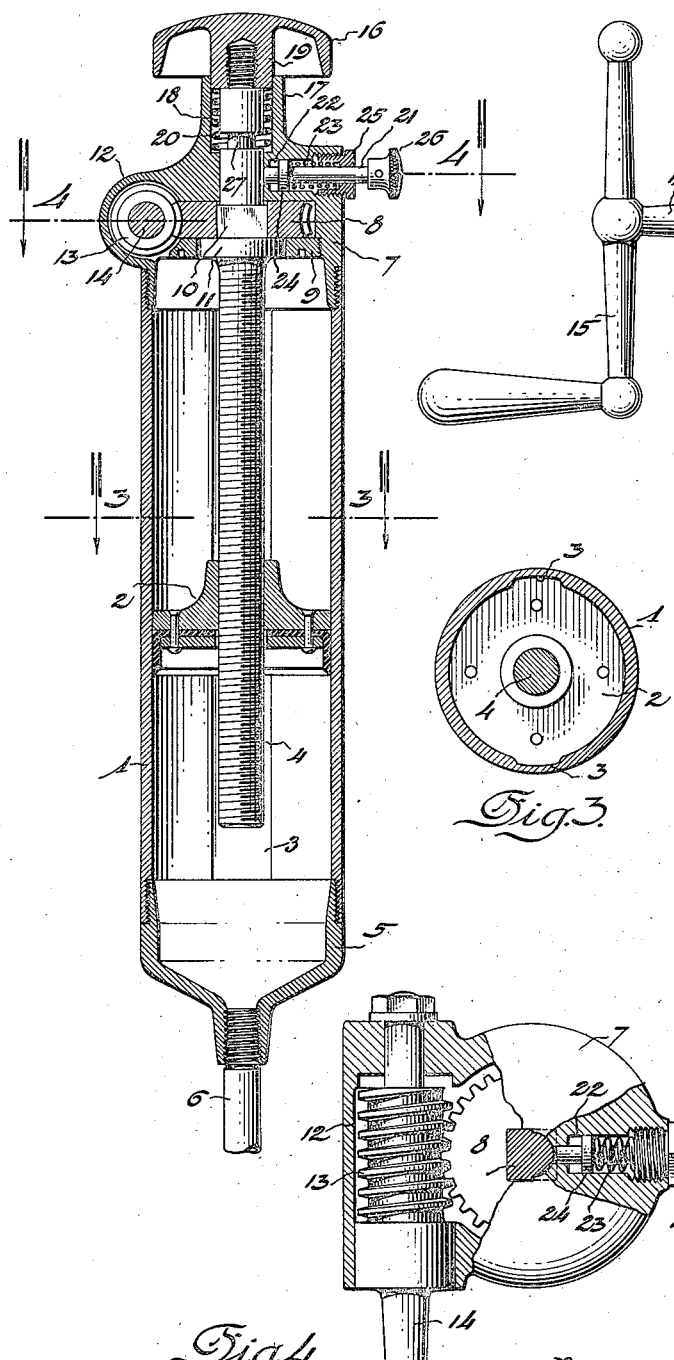
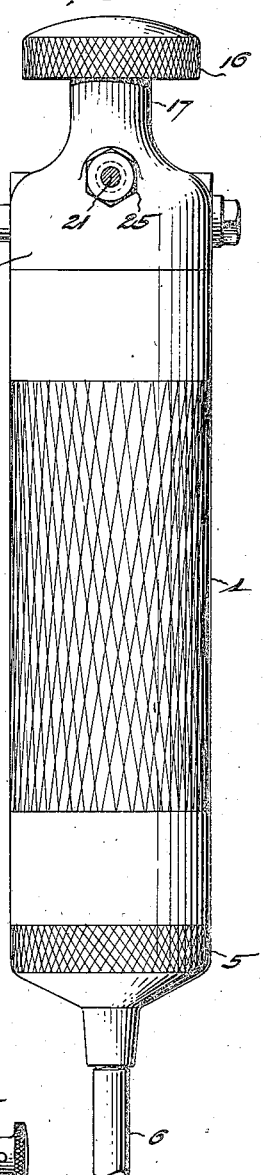
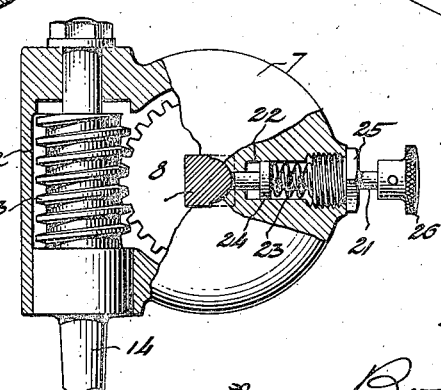
Inventor:
Albert J. Farmer
By
Attorneys Patented Oct. 23, 1923.

1,471,330

UNITED STATES PATENT OFFICE.

ALBERT J. FARMER, OF CHICAGO, ILLINOIS.

GREASE GUN.

Application filed February 20, 1922. Serial No. 537,848.

*To all whom it may concern:*

Be it known that I, ALBERT J. FARMER, a citizen of the United States of America, residing at Chicago, in the county of Cook and State of Illinois, have invented certain new and useful Improvements in Grease Guns, of which the following is a specification, reference being had therein to the accompanying drawings.

This invention relates to lubricating devices and more particularly to improvements in the class of such devices known as grease guns. The object of the invention is to provide a quick return movement of the ejecting piston and simple means for releasing the power operating means from the piston rod. It is also an object to provide certain other new and useful features in the construction and arrangement of parts, all as hereinafter more fully described.

With the above and other ends in view the invention consists in the matters hereinafter set forth and more particularly pointed out in the appended claims, reference being had to the accompanying drawing in which Figure 1 is a side elevation of a grease gun illustrative of the invention;

Fig. 2 is a longitudinal section through the same;

Fig. 3 is a transverse section upon the line 3—3 of Fig. 2; and

Fig. 4, a similar section substantially upon the line 4—4 of Fig. 2.

As shown in the drawing 1 indicates a barrel or cylinder within which is a piston 2 of suitable construction having lateral projections 3 engaging longitudinal grooves in opposite sides of the cylinder wall to prevent rotation of the piston therein as it is moved longitudinally therein by a piston rod or stem 4 which is screw-threaded to engage a screw-threaded opening in the piston. The lower end of the cylinder is closed by a suitable cap or closure 5 having a discharge nipple 6 into which is screwed a discharge pipe 6 and the opposite end of the cylinder is closed by a head 7 providing a bearing for the upper end of the stem 4 and through which said stem extends. Power means is provided for turning the stem 4 comprising a worm wheel 8 seated in a recess in the head and held therein by a ring 9 screw-threaded into the inner end of the recess against the under side of the worm wheel, said stem being provided with a piston 10 which is formed rectangular in cross-section to fit within a rectangular opening in the wheel and an enlargement or collar 11 to engage the under side of the wheel, said stem being thus connected to the wheel to turn therewith and to slide longitudinally therefrom upon endwise inward movement of the stem relative to the wheel. Within a lateral enlargement or chamber 12 of the head 7 is mounted a worm 13 in mesh with the worm wheel 8 and an extended end or shaft 14 of the worm is provided with a crank 15 by means of which the worm may be turned to turn the stem 4 through the turning movement of the wheel 8 and thus move the piston in the cylinder to force the lubricant therefrom. Power applied to the crank 15 is multiplied by the worm and wheel and the motion is reduced, thereby putting a heavy pressure upon the lubricant below the piston to force it from the cylinder.

The above described construction of grease gun is the subject of my prior application Serial Number 502,742 filed by me Sept. 23, 1921, and forms no part of my present application with the exception of the manner of holding the worm wheel 8 in place and detachably connecting the same to the rod or stem 4, the present invention relating to the hereinafter described method and construction for disconnecting the piston rod or stem 4 from the worm drive so that the piston may be returned to the upper or inner end of the cylinder with a comparatively quick return movement and direct turning of the stem.

To move the stem 4 longitudinally inward and thus disconnect the formed portion 10 thereof from the worm wheel 8 and also to provide a hand-hold by means of which the stem may be rotated directly by the operator, a hand wheel 16 is mounted upon the upper end of the rod or stem 4, which end projects through an upward extension 17 of the head 7, said extension being formed hollow or with a chamber 18 to receive the hub portion 19 of the hand wheel and within which chamber is a spring 20 sleeved upon the stem between the bottom of the chamber and the inner end of the hub to exert a force tending to normally move the rod 4 longitudinally outward through the head. To hold the rod 4 moved inwardly against the action of the spring 20 and out of engagement with the worm wheel 8 so that it may be turned freely by means of the hand wheel 16 and thus move the piston toward the upper end of the cylinder with a comparatively quick movement, a latch or spring catch is provided comprising a rod 21, mounted within a bore 22 extending inward from one side of the head 7 with the inner end of the rod engaging the stem 4 and yieldingly held in contact therewith by a spring 23 sleeved upon the rod within the bore between a collar 24 on the rod and a cap or plug 25 screwed into the outer end of the bore. A head 26 is provided on the outer end of the rod which projects through the plug, by means of which head the rod may be moved endwise against the action of said spring, and the stem 4 is provided with an annular groove 27 to be engaged by the inner end of the rod 21 when the stem is moved inwardly and hold said stem with its formed portion 10 out of engagement with the worm wheel 8, at the same time permitting free rotation of the stem by the hand wheel 16 for turning the screw stem or piston rod.

When the piston has been forced to the lower end of its stroke to expel the lubricant from the cylinder, by the turning of the screw stem 4 by means of the worm and worm wheel, and it is desired to retract the piston to the upper or inner end of its stroke so that the cylinder may be refilled with lubricant, this retraction of the piston may be effected by a comparatively rapid rotation of the stem, by simply pressing inward upon the hand wheel 16 against the action of the spring 20, to disengage the stem from the worm drive, when the inner end of the rod 21 will snap into the groove 27 in the stem and said stem will be held in the position to which it is moved. The operator may then turn the stem 4 direct, by means of the hand wheel and the piston will be quickly retracted. When the cylinder has been again filled and it is desired to repeat the operation, the catch is released by pulling outward on the rod 21 against the action of the spring 23 thereby releasing the stem 4 which will at once be moved endwise by the spring 20 to engage its formed portion 10 with the worm wheel 8 and operatively connect the stem to the worm drive.

The disconnection or connection of the stem to the worm drive is thus quickly and easily effected and a great saving in time in the operation of the gun is effected by being able to retract the piston by a direct operation of the operating stem instead of through the slow motion imparted thereto by the worm drive.

Obviously changes in the particular arrangement and construction of parts may be made within the scope of the appended claims and I do not therefore limit myself to the particular form or construction shown.

Having thus fully described my invention, what I claim is:—

1. A device of the character described wherein a piston is reciprocated by a rotatable stem and wherein said stem is rotated at a low speed by driving means including a member slidably engaged by the stem, and means for turning the stem independently of said driving means, said means facilitating sliding said stem relative to said member for disengaging said stem from said member to permit independent rotation of the stem by said turning means.

2. A device of the character described wherein a piston is reciprocated by a rotatable stem and wherein said stem is rotated at a low speed by driving means including a member slidably engaged by the stem, means for turning the stem independently of said driving means, said means facilitating sliding said stem relative to said member for disengaging said stem from said member to permit independent rotation of the stem by said turning means, and means for holding said stem in disengaged position.

3. A device of the character described wherein a piston is reciprocated by a rotatable stem and wherein said stem is rotated at a low speed by driving means including a wheel having a formed opening to receive a formed portion of the stem and operatively connect the wheel and stem to turn together and permit a disconnection by an endwise movement of the stem, and a hand wheel on the outer end of the stem for turning the same independently of said driving means.

4. A device of the character described wherein a piston is reciprocated by a rotatable stem and wherein said stem is rotated at a low speed by a worm drive including a worm wheel having a formed opening to receive a formed portion of the stem and cause said wheel and stem to turn together and to permit a disengagement by an endwise movement of said stem, means to yieldingly resist the endwise movement of the stem in one direction, a hand wheel on the outer end of the stem to turn the stem independently of said worm drive, and means for locking said stem against the action of said yielding means.

5. In a device of the character described, the combination with a cylinder, a piston in the cylinder, a screw stem for operating the piston, means for turning the stem at a low speed and with increased power including a wheel engaging the said stem, said stem being movable to disengage said stem from said wheel, a hand wheel on the outer end of the stem for turning said stem independently of said turning means, a spring to normally hold said stem engaged with said wheel of said turning means, and locking means to hold the stem moved against the action of said spring.

6. In a device of the character described, the combination with a cylinder, a piston in said cylinder, and a screw-threaded stem to engage and reciprocate the piston, of a head on the cylinder formed with a chamber and through which said stem extends, worm-drive mechanism including a worm wheel sleeved upon the stem within the head and operatively connected to the stem to turn therewith, said stem being longitudinally movable to effect operative disengagement thereof from said wheel, means carried by the head for holding said wheel and permitting free rotation thereof, a hand wheel on the outer end of the stem, a spring to normally hold said stem in position to operatively engage said wheel, and a spring operated locking member to hold said stem out of operative engagement with said wheel, said stem being formed with a circumferential groove to receive said locking member.

7. In a grease gun, a piston, a screw driving member, a piston operating screw having a sliding fit in said screw driving member to establish a driving relation, said screw having a reduced portion shiftable into said screw driving member to temporarily release said screw relative to said driving member, and means to facilitate moving said screw.

8. A grease gun as called for in claim 7, and means engageable with the reduced portion of said screw to hold it in a released position relative to said driving member.

In testimony whereof I affix my signature in presence of two witnesses.

ALBERT J. FARMER.

Witnesses:
ANNA M. DORR,
LEWIS E. FLANDERS.